(No Model.)
E. W. MACKENZIE-HUGHES.
CAR COUPLING.
No. 467,173. Patented Jan. 19, 1892.
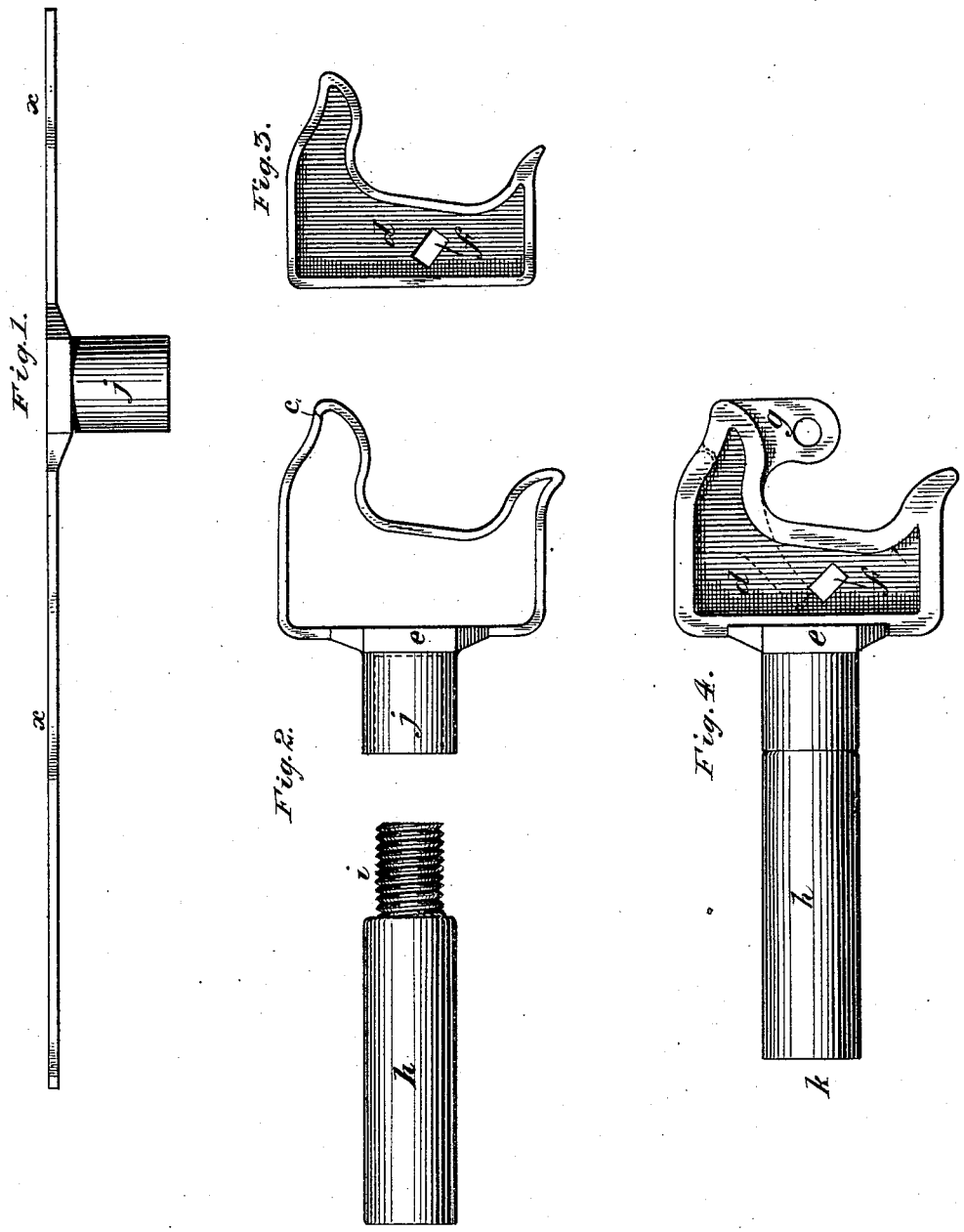

UNITED STATES PATENT OFFICE.

EDWARD WILLIAM MACKENZIE-HUGHES, OF ERICSTANE, HELENSBURGH, SCOTLAND.

CAR-COUPLING.

SPECIFICATION forming part of Letters Patent No. 467,173, dated January 19, 1892.

Application filed November 27, 1891. Serial No. 413,275. (No model.) Patented in England June 4, 1891, No. 9,463.

*To all whom it may concern:*

Be it known that I, EDWARD WILLIAM MACKENZIE-HUGHES, a citizen of the United Kingdom of Great Britain and Ireland, residing at Ericstane, Helensburgh, in the county of Dumbarton, Scotland, have invented new and useful Improvements in Car-Couplings, (which have not been patented in any country except Great Britain, by Letters Patent dated June 4, 1891, No. 9,463;) and I do hereby declare that the following is a full, clear, and exact description of the invention, which will enable others skilled in the art or manufacture to which it relates to make and use the same.

This invention has for its object improvements in the manufacture of couplings for railway carriages, cars, and wagons, and whereby the coupler can be made entirely from wrought-iron or steel instead of cast-iron or partly of cast and partly of wrought metal, as heretofore, the improved coupler being much lighter in weight and of greater strength than couplers as ordinarily made.

The method of manufacture constituting my invention is illustrated by Figures 1, 2, 3, and 4 of the accompanying drawings.

Fig. 1 shows the initial process in the manufacture; Fig. 2, the second and third processes. Fig. 3 shows a part of the coupler-head, and Fig. 4 the completed coupler.

The improved method of construction can be applied to any form of coupler, it being understood that I do not claim as part of my invention any particular design, and for illustrative purposes I have depicted the type made by the Standard Car Coupling Company, of Troy, State of New York, United States of America.

As shown by the drawings, the coupler-head is made separately from the shank or stem, and in producing the shank or stem I take a length of tube $h$ of the required diameter and thickness of wall. This tube is heated at one end and closed down at the part $i$ by the aid of a mandrel and swages, or otherwise, the screw being stamped at the same time and made to fit the socket $j$. This socket constitutes an end of another length of wrought-iron or steel tube, which to produce the walls of the coupler-head is sawed or split inward from the other end, and after being reheated the split part is by hydraulic or other pressure spread or flared out at right angles to the unsplit part or socket, as seen at Fig. 1. The flared part is then placed between successive cramps or dies and bent to the form shown by Fig. 2, a piece being cut off one of the legs $x$, the ends being welded at $c$ by electric welding or otherwise; or when the parts $x$ are left of equal length the weld is at another point. Top and bottom gusset or web plates $d$, stamped out of wrought metal, as at Fig. 3, are then inserted in the space so inclosed by the walls of the head and welded in position, the complete head of the coupler being thereby formed as seen by Fig. 4. The part marked $e$, which is or may be subsequently attached, constitutes a stop-plate and prevents the coupler from turning round when in service. Holes $f$ are made in the web-plates $d$ to receive the locking-pin of the knuckle $g$, the latter, being made from a solid block of wrought metal, working between the plates $d$ in the usual manner—that is to say in a hole in the coupler-face which is punched in the walls before bending or welding takes place, and is subsequently machined out.

Having now described the invention, what I desire to claim and secure by Letters Patent is—

1. In a car-coupler, the combination of a shank made from a wrought-metal tube and walls of the coupler-head, formed with a socket upon them, made from wrought metal, shaped as set forth, and screwed to said shank, substantially as described.

2. In a car-coupler, the combination of a shank made from a wrought-metal tube closed and screwed at one end, walls of the coupler-head made from a strip of wrought metal, having a socket to receive said shank, said walls being shaped to the required contour and welded, and wrought-metal gusset-plates welded or otherwise secured to said walls, substantially as described.

3. In a car-coupler, the combination of a shank made from a wrought-metal tube closed and screwed at one end, walls of coupler-head made from a strip of wrought metal shaped to the required contour and having a socket to receive said shank, gusset-plates stamped from wrought metal and welded or otherwise united to said walls, a coupling-knuckle forged from wrought metal and acting between said gusset-plates, and a stop-plate riveted or otherwise secured to the shank and one gusset-plate, said stop-plate and gusset-plate having holes for the reception of a bolt to lock the coupling-knuckle, substantially as described.

In witness whereof I have hereunto set my hand and seal the 7th day of September, 1891.

EDWARD WILLIAM MACKENZIE-HUGHES. [L. S.]

Witnesses:
GEO. M. CRUIKSHANK,
*Chartered Patent Agent, 62 St. Vincent Street, Glasgow.*
JNO. ARMSTRONG, JNR.,
*Clerk, 62 St. Vincent Street, Glasgow.*